(12) United States Patent
Leung

(10) Patent No.: US 11,284,498 B2
(45) Date of Patent: Mar. 22, 2022

(54) MULTI-CONTROL PHASE CONTROL DIMMING SYSTEM

(71) Applicant: Leadwell Technology Development Limited, Hong Kong (CN)

(72) Inventor: Hong Tai Leung, Hong Kong (CN)

(73) Assignee: Leadwell Technology Development Limited, Hong Kong (CN)

( * ) Notice: Subject to any disclaimer, the term of this patent is extended or adjusted under 35 U.S.C. 154(b) by 0 days.

(21) Appl. No.: 16/759,270

(22) PCT Filed: May 29, 2019

(86) PCT No.: PCT/CN2019/089026
§ 371 (c)(1),
(2) Date: Apr. 24, 2020

(87) PCT Pub. No.: WO2020/220424
PCT Pub. Date: Nov. 5, 2020

(65) Prior Publication Data
US 2022/0046778 A1      Feb. 10, 2022

(30) Foreign Application Priority Data

Apr. 30, 2019 (CN) .......................... 201910362241.3

(51) Int. Cl.
*H05B 39/04*          (2006.01)
*H05B 47/185*        (2020.01)

(52) U.S. Cl.
CPC .................................. *H05B 47/185* (2020.01)

(58) Field of Classification Search
CPC .................................................... H05B 47/185
IPC ...................................................... H05B 39/04
See application file for complete search history.

(56) References Cited

U.S. PATENT DOCUMENTS

| 2019/0098717 A1* | 3/2019 | Fukuda | H05B 47/185 |
| 2019/0098723 A1* | 3/2019 | Sadwick | H05B 45/3578 |
| 2019/0104583 A1* | 4/2019 | Konishi | H05B 45/375 |

* cited by examiner

*Primary Examiner* — Minh D A
(74) *Attorney, Agent, or Firm* — Knobbe, Martens, Olson & Bear, LLP

(57) ABSTRACT

A master dimmer and one or more dimming control modules use embedded pulse width modulation signal to carry out phase control dimming for lighting equipment. Communication between the master dimmer and the dimming control module(s) is carried out on a communication wire which connects between them. Encoded control signals are embedded onto the voltage carrying communication wire for the communication between the master dimmer and all the dimming control modules. The master dimmer is the only device which connects to the load, such as lamps. Dimming control modules send embedded control commands to the master dimmer and the master dimmer will decode the control commands and then carry out phase control dimming to the load. The combination of master dimmer and dimming control modules provides a simple multi locations dimming control system.

13 Claims, 3 Drawing Sheets

MULTI-CONTROL PHASE CONTROL DIMMING SYSTEM

CROSS-REFERENCE TO RELATED APPLICATIONS

This application is the U.S. National Phase under 35. U.S.C. § 371 of International Application PCT/CN2019/089026, filed May 29, 2019, which claims priority to Chinese Patent Application No. 201910362241.3, filed Apr. 30, 2019.

BACKGROUND

Mechanical switches are often used on lighting ON/OFF applications. Nowadays, semiconductor and electronic control switches are getting more commonly used on ON/OFF switching circuits. Patent CN104812128A disclosed the application of electronic switches on multi control ON/OFF switches. Patent CN104812128A indicated that electronic switches can be used to replace the traditional mechanical ON/OFF switches in most environments.

Most of the existing domestic Triac and electronic control dimmers do not provide multi location dimming control features. Commercial dimmers provide the feature of multi location dimming control but most of the commercial dimming systems require both the Live and Neutral wire connection to the dimming system. This makes the installation of a commercial dimming system more difficult for most domestic applications due to most of the existing domestic On/Off switch back boxes have only one wire, the Live wire of main power supply, inside the switch wall box. And therefore, rewiring need to be carry out in most domestic applications for instating a commercial dimming system. This invention provides a multi-control dimming system without the requirement of the Neutral wire connection for the domestic market. Hence, a big saving on the in wall rewiring process can be achieved.

SUMMARY OF INVENTION

This invention is a multi-control phase control dimming system which embeds control signals into the voltage supply line to communicate between dimming control modules. The dimming system consists of a Master Dimmer and one or more Dimming Control Modules.

The Master Dimmer consists of a Code Detection Circuit, an Input Protection Circuit, a Power Supply and Synchronization Circuit, a Phase Cutting and Protection Circuit, a Main Control Circuit and a Dial Switch and Encoder Circuit.

The Dimming Control Module Consists of a Dimming Control Module Input Protection Circuit, a Dimming Control Module Encoder circuit, a Dimming Control Module Power Supply and Synchronization Circuit, a Dimming Control Module Control Circuit and a Dimming Control Module Dial Switch and Encoder Circuit.

Communication between the Master Dimmer and one or more Dimming Control Module are carried out on a communication wire (S) which connects the Master Dimmer and all Dimming Control Modules. Control signals are embedded onto the voltage carrying communication wire (S) for the communication between the Master Dimmer and Dimming Control modules. The Master Dimmer is the only device which connects to the load (lamps). Dimming Control modules send embedded commands to the Master Dimmer via the communication wire (S) and the Master Dimmer will decode the commands received and then carry out phase control dimming to the load (lamps). The Master Dimmer also has it's own dial control to control the brightness of the load. Therefore, both the Master Dimmer and the Dimming Control Modules control the brightness of the load (lamps). The combination of Master Dimmer and Dimming Control Module provides a simple multi locations dimming control system. Since the communication between the Master Dimmer and Dimming Control module is based on a single communication wire (S) and the Live wire (L) of main power supply, the existing in-wall wiring of the 2-way and 3-way circuits can be used, i.e., without the requirement of rewiring the in-wall wires.

DETAIL DESCRIPTION

Figure 1:
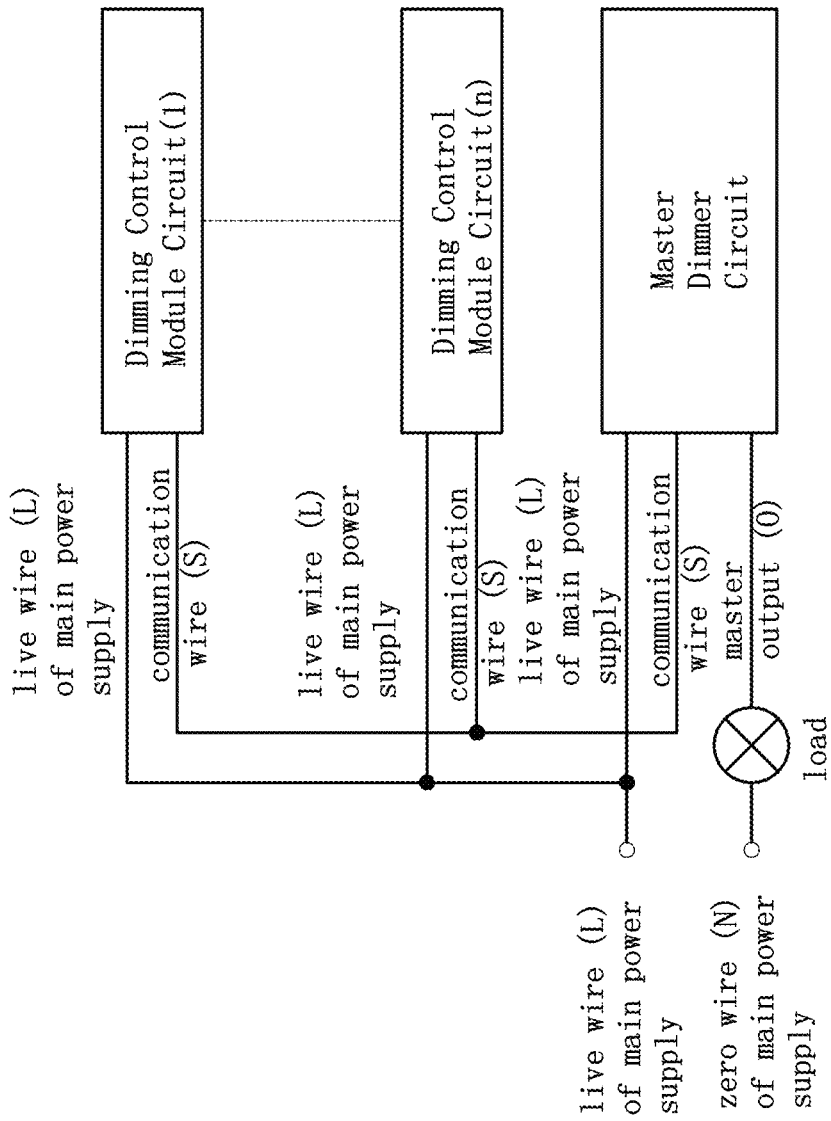
FIG. 1—Master Dimmer and Dimming Control Module connection.

This invention consists of a Master Dimmer and one or more Dimming Control Modules as shown in FIG. 1. Communication between the Master dimmer and Dimming Control Modules are connected by the communication wire (S). The master Dimmer and all Dimming Control Modules are connected to the Live wire (L) of main power supply. The system uses the mains voltage frequency (50 Hz or 60 Hz) of the Live wire (L) of main power supply to works as synchronization signal for communication between Master Dimmer and Dimming Control Modules Dimming Control Module embed encoded pulse width modulation signal between the Live wire (L) of main power supply and the communication wire (S). The Master Dimmer received encoded commands from Dimming Control modules, decode the commands, and carry out the dimming actions according to the commands received.

Dimming Control modules only send encoded commands to the Master Dimmer and Dimming Control Modules do not direct control the loads (lamps). The Master Dimmer also has a built in dial knob and a direct dimming control circuit which carry out dimming control according to the dial knob control signal.

Figure 2:
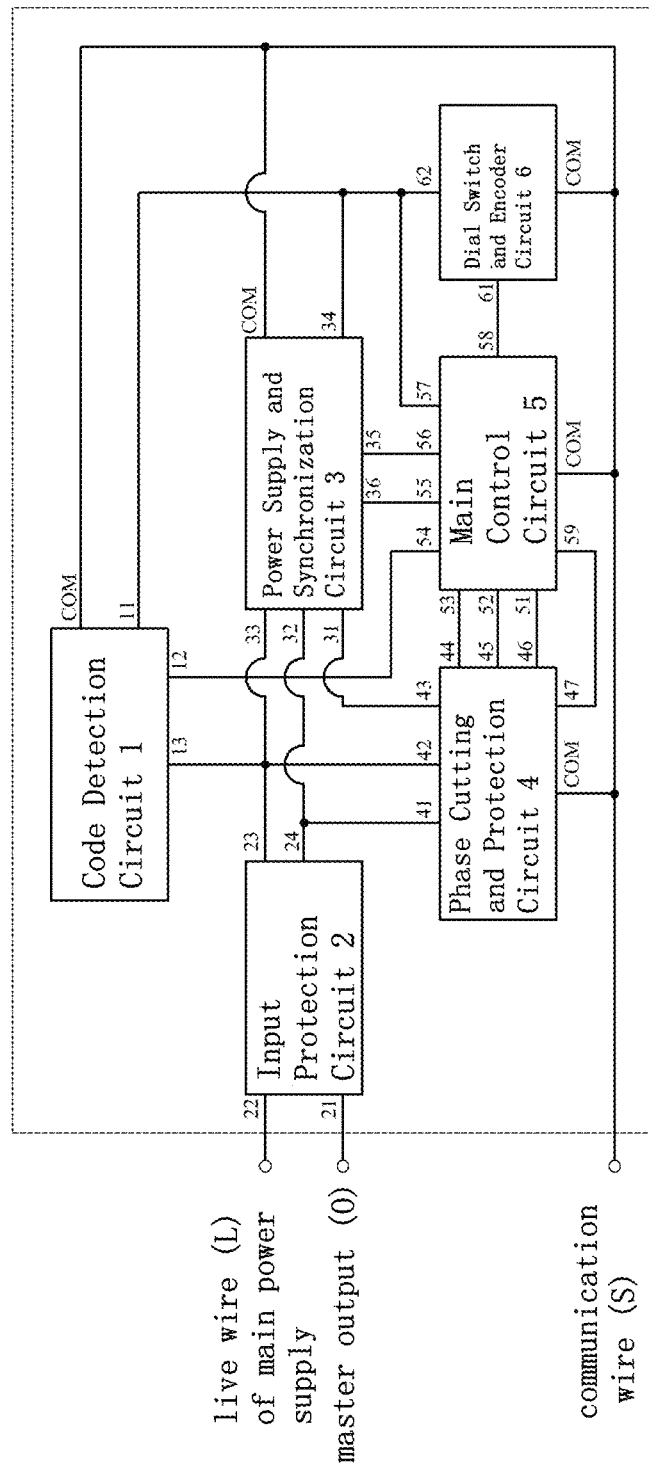
FIG. 2—Master Dimmer circuit block diagram.

FIG. 2 shows the individual circuits within the Master Dimmer and it consists of a Code Detection Circuit 1, an Input Protection Circuit 2, a Power Supply and Synchronization Circuit 3, a Phase Cutting and Protection Circuit 4, a Main Control Circuit 5 and a Dial Switch and Encoder Circuit 6.

The Code Detection Circuit 1 detects incoming encoded signals from the communication wire (S) and regenerates the encoded signal to the Main Control Circuit 5 for decoding. The voltage supply pin 11 of the Code Detection Circuit is connected to the low voltage output 34 of the Power Supply and Synchronization Circuit 3. The signal input detection pin 13 of the Code Detection Circuit 1 is connected to the output 23 of the Input Protection Circuit 2. The encoded signal output 12 of the Code Detection Circuit 1 is connected to the coded voltage signal input 54 of the Main Control Circuit 5. The Common pin (COM) is connected to the communication wire (S).

The Input Protection Circuit 2 has a transient and over temperature protection circuits to prevent transient pulse getting into the rest of the electronic circuits within the device and also provides over heat protection. The input 22 of the Input Protection Circuit is connected to the Live wire (L) of main power supply. The output 23 is connected to load (lamp). The main Live voltage from input 22 goes through the transient and over temperature protection circuits and reach the output 23. The output 23 connects to the signal input detection pin 13 of the Code Detection Circuit 1 and also connects to the input 33 of the Power supply and Synchronization Circuit 3 and the input 42 of the Phase Cutting and Protection Circuit 4. The other output 24 of the Input Protection Circuit 2 connects to the input 32 of Power Supply and Synchronization Circuit 3 and to the input 41 of the Phase Cutting and Protection Circuit 4.

The Power Supply and Synchronization Circuit 3 uses an auto adjusting current charge up method to provide electrical power to the Code Detection Circuit 1, the Phase Cutting and Protection Circuit 4, the Main Control Circuit 5 and the Dial Switch and Encoder Circuit 6. The Power Supply and Synchronization Circuit 3 also provides synchronization signal to the Main Control Circuit 5 for decoding process. In order to eliminate the electrical power up flashes (with lamps connected) when initial power up the circuit, the Power Supply and Synchronization Circuit 3 has a special auto adjusting current charge up circuit which produces a small current to charge up an E-capacitor. When the E-capacitor has been charged up to a required level and the output voltage reaches the operating voltage for the Main Control Circuit 5, The Main Control Circuit 5 will start up and return a feedback signal to the Power Supply and Synchronization Circuit 3 to switch the auto adjusting current charge up circuit from the small charging current to a higher steady current to make sure that the Power Supply and Synchronization Circuit 3 will provide enough power to the rest of the electrical circuits within the device. The input 33 of the Power Supply and Synchronization Circuit 3 is connected to the output 23 of the Input Protection Circuit 2. Another input 32 of the Power Supply and Synchronization Circuit 3 is connected to the other output 24 of the Input Protection Circuit 2. The high voltage (12V) output 31 connects to the high voltage input 43 of the Phase Cutting and Protection Circuit 4. The low voltage (3.3V) output 34 connects to the voltage supply pin 11 of the Code Detection Circuit 1, the input 57 of the Main Control Circuit 5 and the power supply port 62 of the Dial Switch and Encoder Circuit 6. The synchronization signal output 35 of the Power Supply and Synchronization Circuit 3 connects to the synchronization signal input 56 of the Main Control Circuit 5. The charging feedback signal input 36 of the Power Supply and Synchronization Circuit 3 connects to the charge signal 55 of Main Control Circuit 5. The (COM) port connects to the communication wire (S).

The Phase Cutting and Protection Circuit 4 uses MOS transistor for phase cutting operation. It consists of a short-circuit detection and locking circuits. The phase cutting operation is based on the phase-cut signal from the Main Control Circuit 5 to activate the MOS transistor to provide ON/OFF operations. This varies the operating voltage to the load (lamp) and hence providing a phase control dimming control to the lamps. When the phase cutting current reaches a preset short circuit current level, the short circuit locking circuit will activate and shut down the phase cutting circuit, no power will be delivered to the load, and send a short circuit signal to the Main Control Circuit 5. The phase control output will be cut and locked and can only be unlocked by turning off the Main Control Circuit or cutting off the whole device power. The Phase Cutting and Protection Circuit 4 also consists a current detection circuit. The current detection circuit sends the level of detected load current to the Main Control Circuit 5 to determine if an over load is occurred. Input 41 and 42 of the Phase Cutting and Protection Circuit 4 connects to the outputs 24 and 23 of the Input Protection Circuit 2 respectively. The high voltage input 43, for MOS operation, connects to the high voltage output 31 of the Power Supply and Synchronization circuit 3. The short circuit signal input 44 connects to the short circuit locking signal output 53 of the Main Control circuit 5. The short circuit signal output 45 connects to the short circuit detection input 52 of the Main Control Circuit. The current detection output 46 connects the current detection input 51 of the Main Control Circuit 5. The phase cutting signal input 47 connects to the phase cutting control signal output 59 of the Main Control Circuit. The COM port connects to the communication wire (S).

The Main Control Circuit 5 uses a low power consumption microprocessor as the heart of the circuit. The microprocessor has built in PWM, ADC and EEPROM. After the Main Control Circuit 5 powered up, the microprocessor will switch to the low power operation mode and a signal from charge signal 55 to the charging feedback signal input 36 of the Power Supply and Synchronization Circuit 3 to switch from the slow charging current to a higher steady current to make sure that the Power Supply and Synchronization Circuit 3 will provide enough power to the rest of the electrical circuits within the device. Inputs 56 and 54 of the Main Control Circuit 5 receive the synchronization signal from the output of the Power Supply and Synchronization Circuit 3 and the encoded voltage signal from the Code Detection Circuit 1. Then decode the received signal and carry out the phase control commands according to the received control commands. The Main Control Circuit 5 also received and carries out phase control commands from the Dial Switch and Encoder Circuit 6 through the dial control input 58. The Main Control Circuit 5 sends phase control commands through phase cutting control signal output 59 to the Phase Cutting and Protection Circuit 4 to carry out dimming control. The Main Control Circuit 5 receives short circuit signal through the short circuit detection input 52 and determine if there is a short circuit occurs and then send a short circuit command from the short circuit locking signal output 53 to the Phase Cutting and Protection Circuit 4 to cut power and locked the circuit into the no power output state. The Main Control Circuit 5 receives current detection signal through the current detection input 51 and determine if there is an over current (over load) and carry out necessary action. The current detection input 51 of the Main Control Circuit 5 connects to the current detection output 46 of the Phase Cutting and Protection Circuit 4. The short circuit detection input 52 of the Main Control Circuit 5 connects to the short circuit signal output 45 of the Phase Cutting and Protection Circuit 4. The short circuit locking signal output 53 is connected to the short circuit signal input 44 of the Phase Cutting and Protection Circuit 4. The encoded voltage signal input 54 connects to the encoded signal output 12 of the Code Detection Circuit 1. The charge signal 55 is connected to the charging feedback signal input 36 of the Power Supply and Synchronization Circuit 3. The synchronization signal input 56 is connected to the synchronization signal output 35 of the Power Supply and Synchronization Circuit 3. The low level power input 57 is connected to the low voltage output 34 of the Power Supply and Synchronization Circuit 3. The dial control input 58 is connected to the dial control output 61 of the Dial Switch and Encoder Circuit 6. The phase cutting control signal output 59 is connected to the phase cutting signal input 47 of the Phase Cutting and Protection Circuit 4. The COM port is connected to the communication wire (S).

The Dial Switch and Encoder Circuit 6 has a push ON/OFF dial encoder switch which generates ON/OFF signal, encoded clockwise and anti-clockwise signals. The dial control output 61 of the Dial Switch and Encoder Circuit 6 connects to the dial control input 58 of the Main Control Circuit 5. The power supply port 62 is connected to the low voltage output 34 of the Power Supply and Synchronization Circuit 3. The COM port of the Dial Switch and Encoder Circuit 6 is connected to the communication wire (S).

Figure 3:
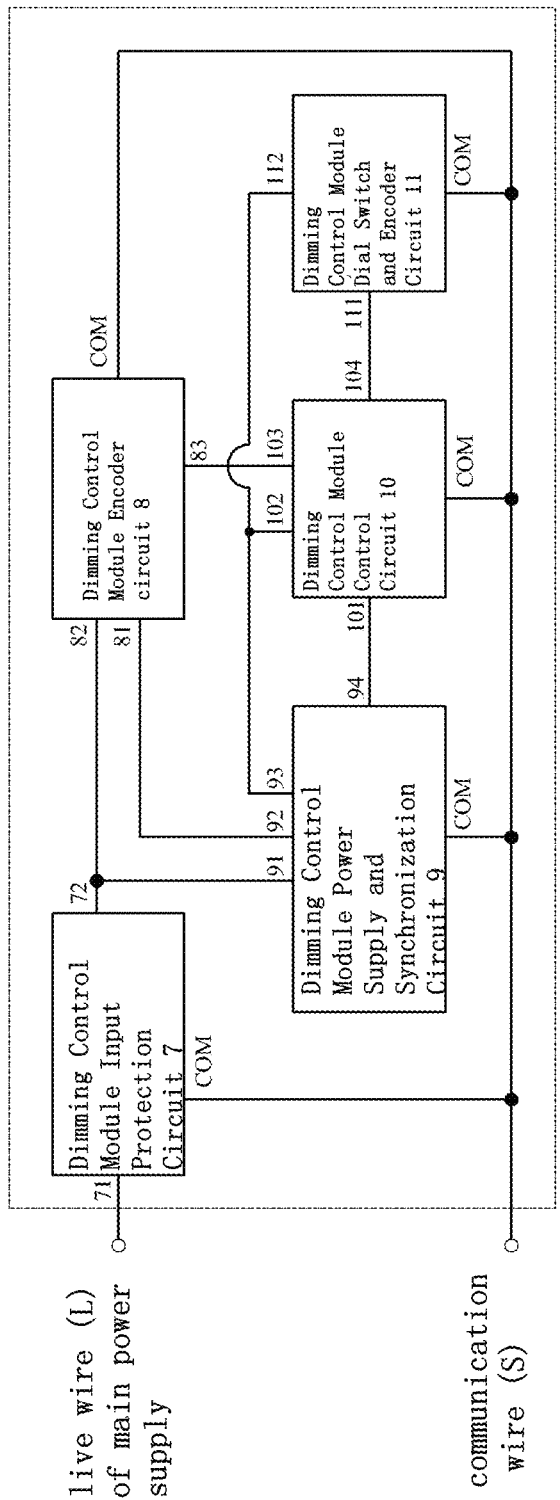
FIG. 3—Dimming Control Module circuit block diagram.

FIG. 3 shows the individual circuits within the Dimming Control Module and it consists of a Dimming Control Module Input Protection Circuit 7, Dimming Control Module Encoder Circuit 8, a Dimming Control Module Power Supply and Synchronization Circuit 9, a Dimming Control Module Control Circuit 10 and a Dimming Control Module Dial Switch and Encoder Circuit 11.

The Dimming Control Module Input Protection Circuit 7 consists of a transient protection circuits to prevent transient pulse getting into the rest of the circuits in the Dial Control module. The input 71 of the Dimming Control Module Input Protection Circuit 7 is connected to the Live wire (L) of main power supply. The voltage output 72 of Dimming Control Module Input Protection Circuit 7 connects to the voltage input 82 of the Dimming Control Module Encoder Circuit 8 and power input 91 of the Dimming Control Module Power Supply and Synchronization Circuit 9.

The COM port is connected to the communication wire (S).

The Dimming Control Module Encoder Circuit 8 uses a MOS transistor to build and embed the encoding signal into voltage carrier. Encoding process will be carried out according to the encoding control signal coming from the control output port 103 of the Dimming Control Module Control Circuit 10. The pulse width modulation encoded control signal will be embedded into the potential different between the Live wire (L) of main power supply and the communication wire (S). The power supply input 81 is connected to the high voltage output 92 of the Dimming Control Module Power Supply and Synchronization Circuit 9. The voltage input 82 is connected to the voltage output 72 of the Dimming Control Module Input Protection Circuit 7. The encoding control signal input 83 is connected to the control output port 103 of the Dimming Control Module Control Circuit 10. The COM port is connected to the communication wire (S).

The Dimming Control Module Power Supply and Synchronization Circuit 9 uses an auto adjusting current charge up method to provide electrical power to the Dimming Control Module Encoder Circuit 8, the Dimming Control Module Control Circuit 10 and the Dimming Control Module Dial Switch and Encoder Circuit 11. The Dimming Control Module Power Supply and Synchronization Circuit 9 also provides synchronization signal to the Dimming Control Module Control Circuit 10 for decoding process. The power input 91 of the Dimming Control Module Power Supply and Synchronization Circuit 9 is connected to the voltage output 72 of the Dimming Control Module Input Protection Circuit 7. The high voltage output 92 is connected to the power supply input 81 of the Dimming Control Module Encoder Circuit 8. The low voltage output 93 is connected to both power supply input 102 of the Dimming Control Module Control Circuit 10 and power supply port 112 of the Dimming Control Module Dial Switch and Encoder Circuit 11. The voltage synchronization signal output 94 is connected to the synchronization signal input 101 of the Dimming Control Module Control Circuit 10. The COM port is connected to the communication wire (S).

The Dimming Control Module Control Circuit 10 uses a low power consumption microprocessor as the heart of the circuit. The microprocessor has built in PWM, ADC and EEPROM. The Dimming Control Module Control Circuit 10 receives and carries out phase control commands from the Dimming Control Module Dial Switch and Encoder Circuit 11 through the encoded dial signal input port 104. The Dimming Control Module Control Circuit 10 also receives synchronization signal from the Dimming Control Module Power Supply and Synchronization Circuit 9. The Dimming Control Module Control Circuit 10 will then generate encoding control signal to the Dimming Control Module Encoder Circuit 8 for embedding encoded signal on the voltage communication wire. The synchronization signal input 101 of the Dimming Control Module Control Circuit 10 connects to the voltage synchronization signal output 94 of the Dimming Control Module Power Supply and Synchronization Circuit 9. The power supply input 102 connects to the low voltage output 93 of Dimming Control Module Power Supply and Synchronization Circuit 9. The control output port 103 connects to the encoding control signal input 83 of Dimming Control Module Encoder Circuit 8. The encoded dial signal input port 104 is connected to the dial output port 111 of the Dimming Control Module Dial Switch and Encoder Circuit 11. The COM port is connected to the communication wire (S).

The Dimming Control Module Dial Switch and Encoder Circuit 11 has a push ON/OFF dial encoder switch which generates ON/OFF signal, encoded clockwise and anti-clockwise signals. The dial output port 111 of the Dimming Control Module Dial Switch and Encoder Circuit 11 connects to the encoded dial signal input port 104 of the Control-Module Control Circuit 10. The power supply port 112 is connected to the low voltage output 93 of the Dimming Control Module Power Supply and Synchronization Circuit 9. The COM port of the Dimming Control Module Dial Switch and Encoder Circuit 11 is connected to the communication wire (S).

The above application example is for description and explanation purpose. The structure, dimensions and features will be varied according to different applications. All variations based on the structure and theory of this invention should not be excluded in this invention.

What is claimed is:

1. A multi-control phase control dimmer circuit comprising:
 a master dimmer circuit and one or more dimming control module circuits,
 wherein said master dimmer circuit consists of a code detection circuit, an input protection circuit, a power supply and synchronization circuit, a phase cutting and protection circuit, a main control circuit and a dial switch and encoder circuit;
 wherein each of said dimming control module circuits consists of a dimming control module input protection circuit, a dimming control module encoder circuit, a dimming control module power supply and synchronization circuit, a dimming control module control circuit and a dimming control module Dial Switch and encoder circuit;
 said master dimmer circuit and said dimming control module circuit are connected with a communication wire;
 wherein said master dimmer circuit and said dimming control module circuit are both based on the Live wire frequency (50 Hz or 60 Hz) as synchronization signal for control commands communication;

wherein said dimming control module circuit embed voltage pulse width modulation dimming control signal in the potential different between the live wire of main power supply and communication wire;

wherein said dimming control module circuit only send embedded dimming control signal to said master dimmer circuit; said dimming control module circuit does not directly control and connected to the load;

wherein said master dimmer circuit connect and control the brightness of the load base on the control command received from the dimming control module circuit and the Dial Switch and encoder circuit.

2. The multi-control phase control dimmer circuit of claim 1, wherein the code detection circuit consists of a detection circuit which detects incoming pulse width modulation encoded signals from the Live wire of main power supply and the communication wire and regenerates the encoded signal to the main control circuit for decoding;

wherein the voltage supply pin of the code detection circuit is connected to the low voltage output of the power supply and synchronization circuit;

the signal input detection pin of the code detection circuit is connected to the output of the input protection circuit;

the encoded signal output of the code detection circuit is connected to the coded voltage signal input of the main control circuit;

the common pin is connected to the communication wire.

3. The multi-control phase control dimmer circuit of claim 1, wherein the input protection circuit has a transient and over temperature protection circuits to prevent transient pulse getting into the rest of the electronic circuits within the device and also provides over heat protection;

wherein the input of the input protection circuit is connected to the Live wire of main power supply;

the output is connected to load;

the main Live voltage from input goes through the transient and over temperature protection circuits and reach the output;

the output connects to the signal input detection pin of the code detection circuit and also connects to the input of the power supply and synchronization circuits and the input of the phase cutting and protection circuit;

the other output of the input protection circuit connects to the input of power supply and synchronization circuit and to the input of the phase cutting and protection circuit.

4. The multi-control phase control dimmer circuit of claim 1, wherein the power supply and synchronization circuit uses an auto adjusted current charging up method to provide electrical power to the code detection circuit, the phase cutting and protection circuit, the main control circuit and the Dial Switch and encoder circuit;

the power supply and synchronization circuit also provides synchronization signal to the main control circuit for decoding process;

the power supply and synchronization circuit has a special circuit which produces a small current to charge up an E-capacitor;

when the E-capacitor has been charged up to a level, the output voltage reaches the operating voltage of the main control circuit;

the main control circuit will start up and return a feedback signal to the power supply and synchronization circuit to switch from the slow charging current to a higher steady current to make sure that the power supply and synchronization circuit will provide enough power to the rest of the electrical circuits within the device;

wherein the input of the power supply and synchronization circuit is connected to the output of the input protection circuit;

another input of the power supply and synchronization circuit is connected to the other output of the input protection circuit;

the high voltage output connects to the high voltage input of the phase cutting and protection circuit;

the low voltage output connects to the voltage supply pin of the code detection circuit, input of the main control circuit and power supply port of the Dial Switch and encoder circuit;

the synchronization signal output of the power supply and synchronization circuits connects to the synchronization signal input of the main control circuit;

the charging feedback signal input of the power supply and synchronization circuit connects to the charge signal of main control circuit;

the COM port connects to the communication wire.

5. The multi-control phase control dimmer circuit of claim 1, wherein the phase cutting and protection circuit uses MOS transistor for phase cutting operation;

it consists a current detection and a short-circuit locking circuits;

the phase control operation is based on the phase control signal from the main control circuit to activate the MOS transistor to provide ON/OFF operations;

this varies the operating voltage to the load and hence providing a dimming control to the lamps;

wherein inputs of the phase cutting and protection circuit connects to the outputs of the input protection circuit respectively;

the high voltage input connects to the high voltage output of the power supply and synchronization circuit;

the short circuit signal input connects to the short circuit locking signal output of the Main Control circuit;

the short circuit signal output connects to the short circuit detection input of the main control circuit;

the current detection output connects the current detection input of the main control circuit;

the phase cutting signal input connects to the phase cutting control signal output of the main control circuit;

the COM port connects to the communication wire.

6. The multi-control phase control dimmer circuit of claim 1, wherein the main control circuit uses a low power consumption microprocessor as the heart of the circuit; the microprocessor has built in PWM, ADC and EEPROM;

the microprocessor operates in low power operation mode;

wherein Control signal from the charge signal of the main control circuit to the charging feedback signal input of the power supply and synchronization circuit switches from the slow charging current to a higher steady current to make sure that the power supply and synchronization circuit will provide enough power to the rest of the electrical circuits within the device;

inputs of the main control circuit receive the synchronization signal from the output of the power supply and synchronization circuit and the encoded voltage signal from the code detection circuit;

then the received signal is decoded and the decoded Phase control commands is carried out; the main control circuit also receives and carries out phase control commands from the dial switch and encoder circuit through the dial control input;

the main control circuit sends phase control commands through phase cutting control signal output to the phase cutting and protection circuit to carry out dimming control;

the main control circuit receives short circuit signal through the short circuit detection input and determines if a short circuit occurs and then sends a short circuit command from the short circuit locking signal output to the phase cutting and protection circuit to cut power and lock the circuit into no power output state;

the main control circuit receives current detection signal through the current detection input and determines if there is an over current and carries out necessary action; the current detection input of the main control circuit connects to the current detection output of the phase cutting and protection circuit;

the short circuit detection input of the main control circuit connects to the short circuit signal output of the phase cutting and protection circuit; the short circuit locking signal output is connected to the short circuit signal input of the phase cutting and protection circuit;

the encoded voltage signal input connects to the encoded signal output of the code detection circuit; the charge signal is connected to the charging feedback signal input of the power supply and synchronization circuit;

the synchronization signal input is connected to the synchronization signal output of the power supply and synchronization circuit;

the low level power input is connected to the low voltage output of the power supply and synchronization circuit;

the dial control input is connected to the dial control output of the Dial Switch and encoder circuit;

the phase cutting control signal output is connected to the phase cutting signal input of the phase cutting and protection circuit;

the COM port is connected to the communication wire.

7. The multi-control phase control dimmer circuit of claim 1, wherein The Dial Switch and encoder circuit has a push ON/OFF dial encoder switch which generates ON/OFF signal, encoded clockwise and anti-clockwise signals;

the dial control output of the Dial Switch and encoder circuit connects to the dial control input of the main control circuit;

the power supply port is connected to the low voltage output of the power supply and synchronization circuit;

the COM port of the Dial Switch and encoder circuit is connected to the communication wire.

8. The multi-control phase control dimmer circuit of claim 1, wherein the dimming control module input protection circuit consists of a transient protection circuits to prevent transient pulse getting into the rest of the circuits in the Dial Control module;

the input of the dimming control module input protection circuit is connected to the Live wire of main power supply;

the voltage output of dimming control module input protection circuit connects to the voltage input of the dimming control module encoder circuit and power input of the dimming control module power supply and synchronization circuit;

the COM port is connected to the communication wire.

9. The multi-control phase control dimmer circuit of claim 1, wherein the dimming control module encoder circuit uses a MOS transistor to build and embed the encoding signal into voltage carrier; encoding process will be carried out according to the encoding control signal coming from the control output port of the dimming control module Control Circuit;

the pulse width modulation encoded control signal will be embedded into potential different between the Live wire of main power supply and the communication wire; the power supply input is connected to the high voltage output of the dimming control module power supply and synchronization circuit; the voltage input is connected to the voltage output of the dimming control module input protection circuit; the encoding control signal input is connected to the control output port of the dimming control module Control Circuit;

the COM port is connected to the communication wire.

10. The multi-control phase control dimmer circuit of claim 1, wherein the dimming control module power supply and synchronization circuit uses an auto adjusted current charge up method to provide electrical power to the dimming control module encoder circuit, the dimming control module Control Circuit and the dimming control module Dial Switch and encoder circuit;

the dimming control module power supply and synchronization circuit also provides synchronization signal to the dimming control module Control Circuit for decoding process;

the power input of the dimming control module power supply and synchronization circuit is connected to the voltage output of the dimming control module input protection circuit;

the high voltage output is connected to the power supply input of the dimming control module encoder circuit;

the low voltage output is connected to both power supply input of the dimming control module Control Circuit and power supply port of the dimming control module Dial Switch and encoder circuit;

the voltage synchronization signal output is connected to the synchronization signal input of the dimming control module Control Circuit;

the COM port is connected to the communication wire.

11. The multi-control phase control dimmer circuit of claim 1, wherein the dimming control module Control Circuit uses a low power microprocessor as the heart of the circuit;

the microprocessor has built in PWM, ADC and EEPROM;

the dimming control module Control Circuit receives and carries out phase control commands from the dimming control module Dial Switch and encoder circuit through the encoded dial signal input port;

the dimming control module Control Circuit also receives synchronization signal from the dimming control module power supply and synchronization circuit;

the dimming control module Control Circuit will then generate an encoding control signal to the dimming control module encoder circuit for embedding encoded signal on the communication wire;

the synchronization signal input of the dimming control module Control Circuit connects to the voltage synchronization signal output of the dimming control module power supply and synchronization circuit;

the power supply input connects to the low voltage output of dimming control module power supply and synchronization circuit;

the control output port connects to the encoding control signal input of dimming control module encoder circuit;

the encoded dial signal input port is connected to the dial output port of the dimming control module Dial Switch and encoder circuit;

the COM port is connected to the communication wire.

12. The multi-control phase control dimmer circuit of claim 1, wherein the dimming control module Dial Switch and encoder circuit has a push ON/OFF dial encoder switch which generates ON/OFF signal, encoded clockwise and anti-clockwise signals;

the dial output port of the dimming control module dial switch and encoder circuit connects to the encoded dial signal input port of the dimming control module Control Circuit;

the power supply port is connected to the low voltage output of the dimming control module power supply and synchronization circuit;

the COM port of the dimming control module dial switch and encoder circuit is connected to the communication wire.

13. The multi-control phase control dimmer circuit of claim 1, wherein the load comprises lamps.

* * * * *